US010234974B2

(12) United States Patent
Myren et al.

(10) Patent No.: US 10,234,974 B2
(45) Date of Patent: Mar. 19, 2019

(54) TOUCH DEVICE

(71) Applicant: ATMEL CORPORATION, San Jose, CA (US)

(72) Inventors: Steinar Myren, Vikhammer (NO); Rune Watn, Trondheim (NO)

(73) Assignee: Atmel Corporation, Chandler, AZ (US)

( * ) Notice: Subject to any disclaimer, the term of this patent is extended or adjusted under 35 U.S.C. 154(b) by 84 days.

(21) Appl. No.: 15/617,387

(22) Filed: Jun. 8, 2017

(65) Prior Publication Data

US 2017/0364185 A1 Dec. 21, 2017

Related U.S. Application Data

(60) Provisional application No. 62/350,537, filed on Jun. 15, 2016.

(51) Int. Cl.
G09G 1/00 (2006.01)
G06F 3/041 (2006.01)
G06F 3/044 (2006.01)
G09G 3/20 (2006.01)

(52) U.S. Cl.
CPC ............ G06F 3/0412 (2013.01); G06F 3/044 (2013.01); G06F 3/0416 (2013.01); G09G 3/2092 (2013.01); G09G 2310/0254 (2013.01); G09G 2320/0266 (2013.01)

(58) Field of Classification Search
CPC ........ G06F 3/041; G06F 3/044; G06F 3/0488; G09G 3/20; H04N 1/00
See application file for complete search history.

(56) References Cited

U.S. PATENT DOCUMENTS

| 7,663,607 | B2 | 2/2010 | Hotelling |
| 7,864,503 | B2 | 1/2011 | Chang |
| 7,875,814 | B2 | 1/2011 | Chen |
| 7,920,129 | B2 | 4/2011 | Hotelling |
| 8,031,094 | B2 | 10/2011 | Hotelling |

(Continued)

FOREIGN PATENT DOCUMENTS

WO    WO 2012/129247 A2    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

Primary Examiner — Michael Faragalla
(74) Attorney, Agent, or Firm — Baker Botts L.L.P.

(57) ABSTRACT

In certain embodiments, an apparatus includes a display stack and a controller. The display stack includes a display and a ground layer for generating an image for the display. The ground layer includes a plurality of columns. Each column of the plurality of columns includes a plurality of nodes. The controller provides voltages to a first plurality of nodes, respectively, of a first column of the plurality of columns of the ground layer such that a sum of the respective voltages of the first plurality of nodes of the first column is substantially zero. The controller also measures, to determine whether a touch event occurred, respective values at a second plurality of nodes of a second column of the plurality of columns. The respective values at the second plurality of nodes indicate an amount of charge transferred from the first plurality of nodes to the second plurality of nodes.

20 Claims, 10 Drawing Sheets

(56) References Cited

U.S. PATENT DOCUMENTS

| | | |
|---|---|---|
| 8,031,174 B2 | 10/2011 | Hamblin |
| 8,040,326 B2 | 10/2011 | Hotelling |
| 8,049,732 B2 | 11/2011 | Hotelling |
| 8,179,381 B2 | 5/2012 | Frey |
| 8,217,902 B2 | 7/2012 | Chang |
| 8,665,236 B2 * | 3/2014 | Myers .................. G06F 1/1626 345/173 |
| 8,723,824 B2 | 5/2014 | Myers |
| 2008/0309635 A1 | 12/2008 | Matsuo |
| 2009/0315854 A1 * | 12/2009 | Matsuo ................ G06F 3/0412 345/174 |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2013/0076612 A1 | 3/2013 | Myers |

\* cited by examiner

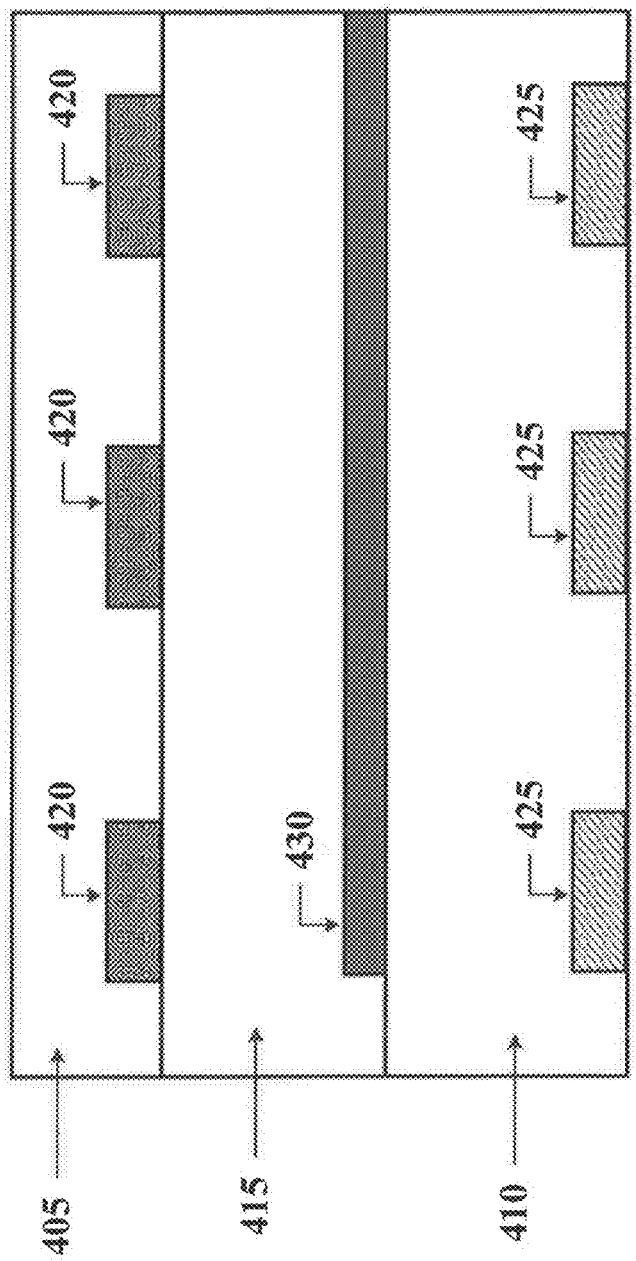

TOUCH DEVICE

CROSS REFERENCE TO RELATED APPLICATIONS

This application claims the benefit of U.S. Provisional Application Ser. No. 62/350,537, entitled "Touch Device," which was filed Jun. 15, 2016, having common inventorship, the entire contents of which are incorporated herein by reference.

TECHNICAL FIELD

This disclosure generally relates to touch sensing technology.

BACKGROUND

According to an example scenario, a touch sensor detects the presence and position of a an object (e.g., a user's finger or a stylus) within a touch-sensitive area of a touch sensor array overlaid on a display screen, for example. In a touch-sensitive-display application, a touch sensor array allows a user to interact directly with what is displayed on the screen, rather than indirectly with a mouse or touch pad. A touch sensor is attached to or provided as part of a desktop computer, laptop computer, tablet computer, personal digital assistant (PDA), smartphone, satellite navigation device, portable media player, portable game console, kiosk computer, point-of-sale device, or other device. A control panel on a household or other appliance may include a touch sensor. There are a number of different types of touch sensors, such as for example resistive touch sensors, surface acoustic wave touch sensors, and capacitive touch sensors.

In one example, when an object physically touches a touch screen within a touch sensitive area of a touch sensor of the touch screen (e.g., by physically touching a cover layer overlaying a touch sensor array of the touch sensor) or comes within a detection distance of the touch sensor (e.g., by hovering above the cover layer overlaying the touch sensor array of the touch sensor), a change in capacitance occurs within the touch screen at a position of the touch sensor of the touch screen that corresponds to the position of the object within the touch sensitive area of the touch sensor. A touch sensor controller processes the change in capacitance to determine the position of the change of capacitance within the touch sensor (e.g., within a touch sensor array of the touch sensor).

BRIEF DESCRIPTION OF THE DRAWINGS

FIGS. 4A-B illustrate example cross-sections of a layer of an example display stack in accordance with an embodiment.

DESCRIPTION OF EXAMPLE EMBODIMENTS

In-cell touch sensing displays have allowed touch sensing devices to be thinner than predecessor devices by implementing a touch sensor array in a display stack of the device. However, in-cell implementations experience two issues that degrade the performance of the device. First, if the touch sensor implements self-capacitance touch sensing, the device experiences a drop in signal in low ground mass conditions. A low ground mass condition occurs when the device is floating relative to ground (e.g., when the device is lying flat on a table with no physical connection to GND like a charger or USB connection) and a finger or other object is touching the touch sensor. In this instance, because the touch sensor is modulated against the device ground, the finger or object forces the potential on the touch sensor to a stable voltage (e.g., the potential of the finger) while the phone ground continues to be modulated. This results in a drop in signal from the touch sensor, which could result in touches being more difficult to detect or touches being undetected.

Second, when portions of the touch sensor are driven with a voltage signal, the signal couples down to the source lines of a display of the display stack. As a result, the display generates visual artifacts, which are undesirable because they degrade a user's experience with the device. For example, the display produces unintended and/or nonsensical image(s) that confuse the user.

This disclosure contemplates an in-cell touch sensing display that detects touches during low ground mass conditions and that avoids generating visual artifacts. A ground layer (also referred to as a common voltage (VCOM) layer) of a display stack is divided into separate nodes. These nodes are arranged in a grid. These nodes operate as electrodes of a touch sensor and as a ground layer of the display stack. As a result, the nodes are referred to as nodes and as electrodes. A first column of nodes is driven and an adjacent column of nodes is sensed to determine whether a touch event occurred. As a result, the device relies on the mutual capacitance between the nodes rather than on the self-capacitance of the nodes to detect touch events, which reduces the signal drop that occurs from a low ground mass condition. Furthermore, the first column of nodes is driven such that a sum of the voltages across the nodes is substantially zero. As a result, little to no charge is transferred to the source lines of the display, which reduces the likelihood of visual artifacts being generated.

Figure 1:
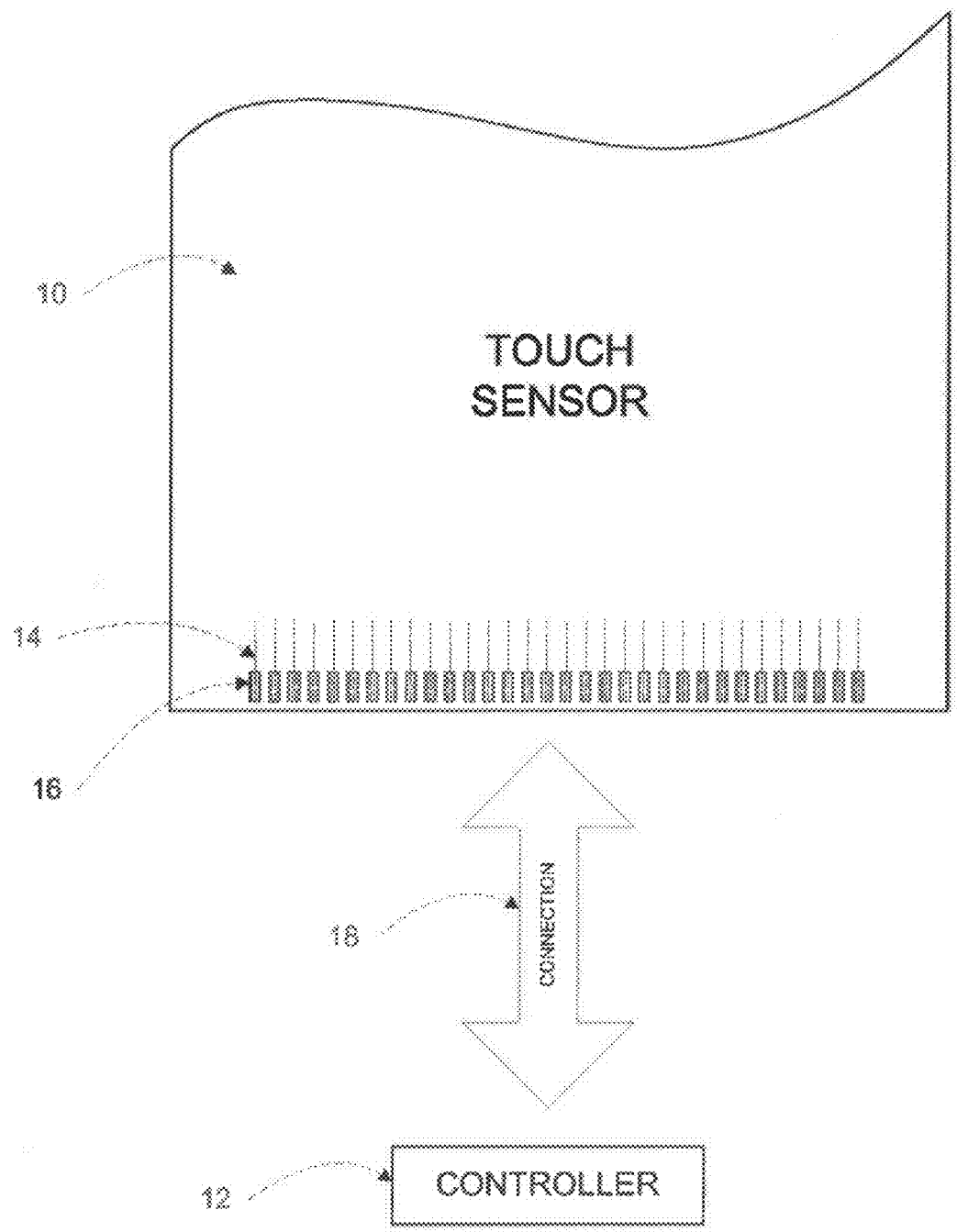
FIG. 1 illustrates an example touch sensor with an example controller in accordance with an embodiment.
Figure 2:
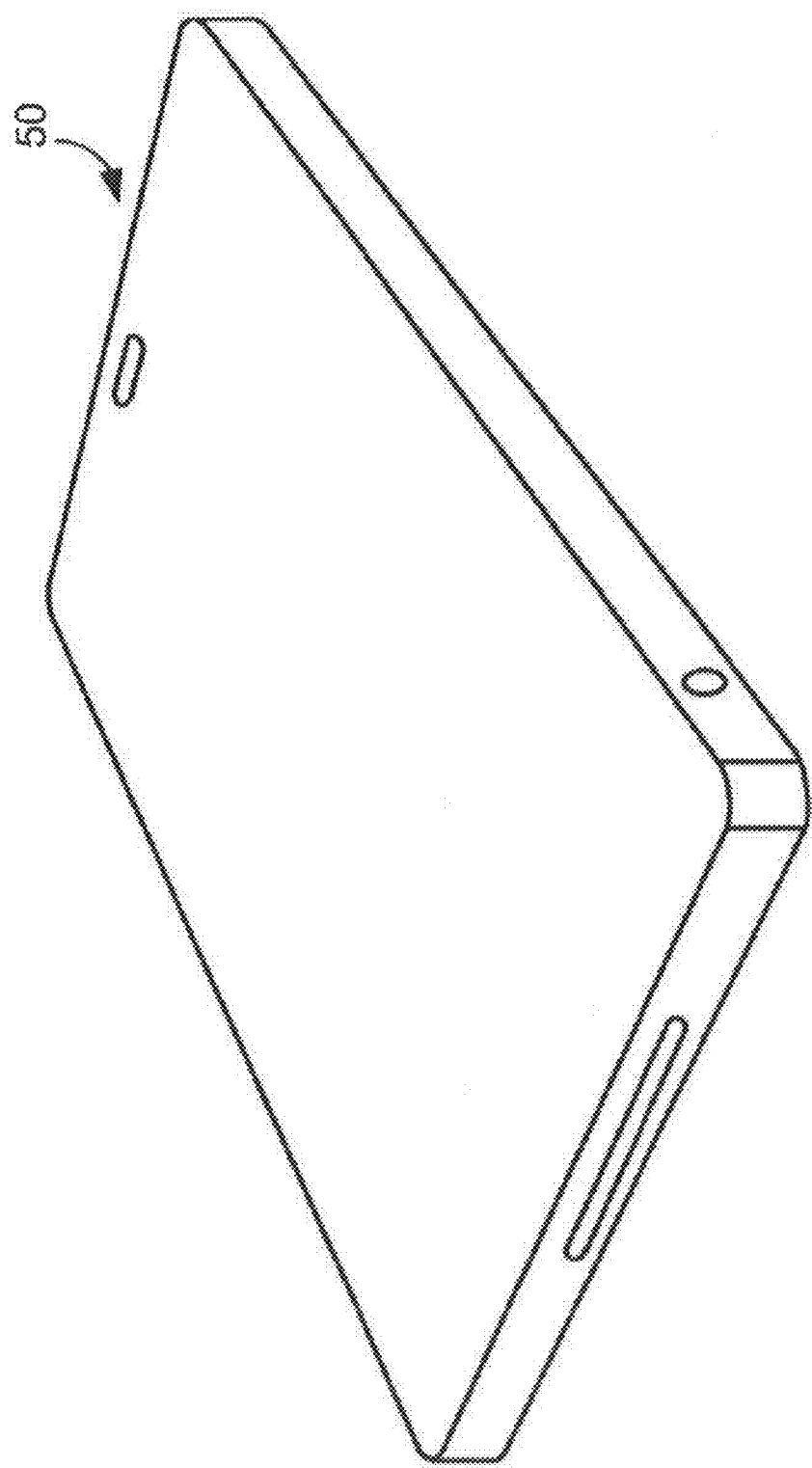
FIG. 2 illustrates an example device incorporating a touch sensor on a mechanical stack in accordance with an embodiment.

Therefore, the in-cell touch sensing display of one embodiment improves the touch sensing capabilities of the device during low ground mass conditions and improves the operation of the display during operation of the touch sensor. The contemplated in-cell touch sensing display will be described in more detail using FIGS. 1 through 8. FIGS. 1 and 2 describe the device generally. FIGS. 3 through 8 describe the device in more detail.

FIG. 1 illustrates an example touch sensor 10 with an example controller 12. Touch sensor 10 and touch-sensor controller 12 detect the presence and location of a touch or the proximity of an object within a touch-sensitive area of touch sensor 10. Herein, reference to a touch sensor encompasses both the touch sensor and its touch-sensor controller, where appropriate. Similarly, reference to a touch-sensor controller encompasses both the touch-sensor controller and its touch sensor, where appropriate. Touch sensor 10 includes one or more touch-sensitive areas, where appropriate. Touch sensor 10 includes an array of nodes (also referred to as electrodes). In one embodiment, the touch-sensitive areas of touch sensor 10 are defined by the array of nodes. Herein, reference to a touch sensor encompasses both the electrodes of the touch sensor and the substrate(s) that they are disposed on, where appropriate. Alternatively, where appropriate, reference to a touch sensor encompasses the electrodes of the touch sensor, but not the substrate(s) that they are disposed on.

An electrode is an area of conductive material forming a shape, such as for example a disc, square, rectangle, other suitable shape, or suitable combination of these. One or more cuts in one or more layers of conductive material may (at least in part) create the shape of an electrode, and the area of the shape may (at least in part) be bounded by those cuts. In one embodiment, the conductive material of an electrode may occupy approximately 100% of the area of its shape. As an example, an electrode may be made of indium tin oxide (ITO) and the ITO of the electrode may occupy approximately 100% of the area of its shape, where appropriate. In one embodiment, the conductive material of an electrode may occupy substantially less than 100% of the area of its shape. As an example, an electrode may be made of fine lines of metal or other conductive material (such as for example carbon nanotubes, copper, silver, or a copper- or silver-based material) and the fine lines of conductive material may occupy substantially less than 100% of the area of its shape in a hatched, mesh, or other suitable pattern. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fills having any suitable patterns. Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack contains a substrate (or multiple substrates) and the conductive material forming the electrodes of touch sensor 10. As an example, the mechanical stack may include a first layer of optically clear adhesive (OCA) beneath a cover panel. The cover panel may be clear and made of a resilient material suitable for repeated touching, such as for example glass, polycarbonate (PC), or poly(methyl methacrylate) (PMMA). This disclosure contemplates any suitable cover panel made of any suitable material. The first layer of OCA may be disposed between the cover panel and the conductive material forming the electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the conductive material making up the electrodes and the dielectric layer, and the dielectric layer may be disposed between the second layer of OCA and an air gap to a display of a device including touch sensor 10 and touch-sensor controller 12. As an example only, the cover panel may have a thickness of approximately 1 millimeter (mm); the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses.

One or more portions of the substrate of touch sensor 10 is made of PET or another suitable material. This disclosure contemplates any suitable substrate with any suitable portions made of any suitable material. In one embodiment, the electrodes in touch sensor 10 are made of ITO in whole or in part. In one embodiment, the drive or sense electrodes in touch sensor 10 are made of fine lines of metal or other conductive material. As an example, one or more portions of the conductive material is copper or copper-based and have a thickness within a range between approximately 1 and approximately 5 microns (μm) and a width within a range between approximately 1 and approximately 10 μm. As another example, one or more portions of the conductive material is silver or silver-based and similarly have a thickness of approximately 1 and approximately 5 μm and a width of approximately 1 and approximately 10 μm. This disclosure contemplates any suitable electrodes made of any suitable material.

Touch sensor 10 may implement a capacitive form of touch sensing. In a mutual-capacitance implementation, touch sensor 10 includes an array of electrodes forming an array of capacitive nodes. The electrodes forming the capacitive node come near each other, but not make electrical contact with each other. Instead, the electrodes may be capacitively coupled to each other across a space between them. A pulsed or alternating voltage applied to one of the electrodes (by touch-sensor controller 12) induces a charge on the other electrode, and the amount of charge induced is susceptible to external influence (such as a touch or the proximity of an object). When an object touches or comes within proximity of the capacitive node, a change in capacitance occurs at the capacitive node and touch-sensor controller 12 measures the change in capacitance. By measuring changes in capacitance throughout the array, touch-sensor controller 12 determines the position of the touch or proximity within the touch-sensitive area(s) of touch sensor 10.

In a self-capacitance implementation, touch sensor 10 includes an array of electrodes that each form a capacitive node. When an object touches or comes within proximity of the capacitive node, a change in self-capacitance occurs at the capacitive node and touch-sensor controller 12 measures the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 determines the position of the touch or proximity within the touch-sensitive area(s) of touch sensor 10. This disclosure contemplates any suitable form of capacitive touch sensing, where appropriate.

Touch sensor 10 may have electrodes disposed in a pattern. In such a configuration, a pair of electrodes capacitively coupled to each other across a space between them form a capacitive node. For a self-capacitance implementation, electrodes of only a single type are disposed in a pattern. The electrodes do not make electrical contact with each other—instead they are capacitively coupled to each other across a dielectric at the intersection. In one embodiment, the electrodes define the touch-sensitive area of touch sensor 10. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 detects and processes the change in capacitance to determine the presence and location of the touch or proximity input. Touch-sensor controller 12 then communicates information about the touch or proximity input to one or more other components (such one or more central processing units (CPUs) or digital signal processors (DSPs)) of a device that includes touch sensor 10 and touch-sensor controller 12, which responds to the touch or proximity input by initiating a function of the device (or an application running on the device) associated with it. Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In one embodiment, touch-sensor controller 12 comprises analog circuitry, digital logic, and digital non-volatile memory. In one embodiment, touch-sensor controller 12 is disposed on a flexible printed circuit (FPC) bonded to the substrate of touch sensor 10, as described below. The FPC may be active or passive. In one embodiment, multiple touch-sensor controllers 12 are disposed on the FPC. Touch-sensor controller 12 supplies drive signals to the electrodes of touch sensor 10 and senses charge at the capacitive nodes of touch sensor 10 and provides measurement signals representing capacitances at the capacitive nodes. Touch sensor controller 12 controls the supply of drive signals to the electrodes and processes measurement signals to detect and process the presence and location of a touch or proximity input within the touch-sensitive area(s) of touch sensor 10. Touch sensor controller 12 also tracks changes in the position of a touch or proximity input within the touch-sensitive area(s) of touch sensor 10. A storage unit, such as a memory of touch sensor controller 12 or coupled to touch sensor controller 12, stores programming for execution by touch sensor controller 12, including programming to supply drive signals to the electrodes, programming for processing measurement signals, and other suitable programming, where appropriate. Although this disclosure describes a particular touch-sensor controller having a particular implementation with particular components, this disclosure contemplates any suitable touch-sensor controller having any suitable implementation with any suitable components. In an embodiment, controller 12 is implemented as more than one separate system, where one system controls a display and another system controls/implements the touch sensing capabilities of the device. These separate systems can communicate with one another.

Tracks 14 of conductive material disposed on the substrate of touch sensor 10 couples the electrodes of touch sensor 10 to connection pads 16. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 provide connections for coupling touch-sensor controller 12 to electrodes of touch sensor 10, through which touch-sensor controller 12 supplies drive signals to the electrodes and/or senses charge at the capacitive nodes of touch sensor 10. Tracks 14 may be made of fine lines of metal or other conductive material. As an example, the conductive material of tracks 14 may be copper or copper-based and have a width of approximately 100 μm or less. As another example, the conductive material of tracks 14 may be silver or silver-based and have a width of approximately 100 μm or less. In one embodiment, tracks 14 are made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 are located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the electrodes of touch sensor 10. In another embodiment, connection pads 16 are connected to an electro-mechanical connector (such as a zero insertion force wire-to-board connector); in this embodiment, connection 18 does not include an FPC. This disclosure contemplates any suitable connection 18 between touch-sensor controller 12 and touch sensor 10.

FIG. 2 illustrates an example device incorporating a touch sensor disposed on a mechanical stack. Examples of device 50 include a smartphone, a PDA, a tablet computer, a laptop computer, a desktop computer, a kiosk computer, a satellite navigation device, a portable media player, a portable game console, a point-of-sale device, another suitable device, a suitable combination of two or more of these, or a suitable portion of one or more of these. In the example of FIG. 2, device 50 includes a touch sensor implemented using a mechanical stack and a display underneath the touch sensor. The one or more substrates of the mechanical stack includes or have attached to it tracking areas, which includes tracks providing drive and sense connections to and from the drive and sense electrodes of the touch sensor. As described above, an electrode pattern of touch sensor made from a conductive mesh using carbon nanotubes, gold, aluminum, copper, silver, or other suitable conductive material. A user of device 50 may interact with device 50 through the touch sensor implemented on a mechanical stack described above. As an example, the user interacts with the device by touching the touch-sensitive area of the touch sensor.

Figure 3:
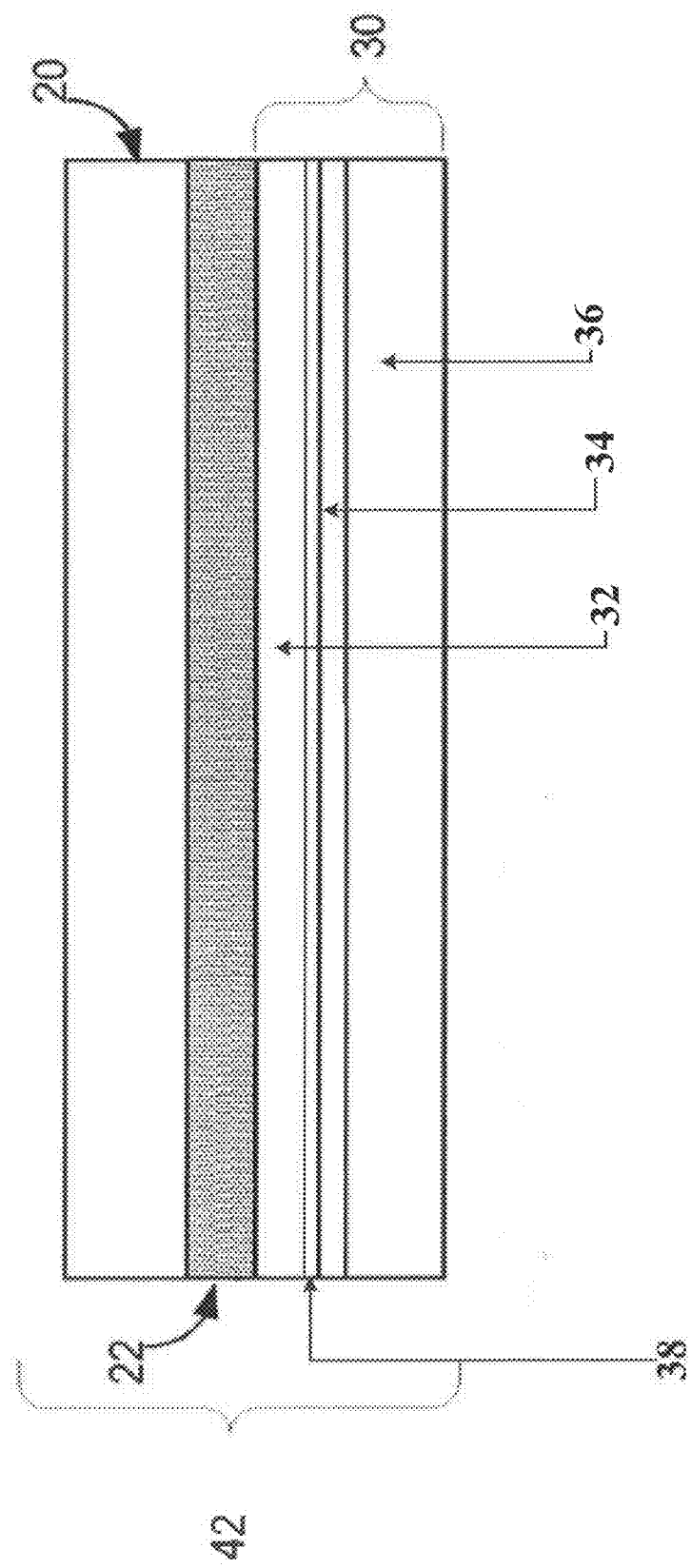
FIG. 3 illustrates an example cross-section of an example mechanical stack in accordance with an embodiment.

FIG. 3 illustrates an example cross-section of example mechanical stack 42. Although this disclosure describes a particular mechanical stack configuration with a particular number of particular layers made of particular materials and having particular thicknesses, this disclosure contemplates any suitable mechanical stack configuration with any suitable number of any suitable layers made of any suitable materials and having any suitable thicknesses. Cover panel 20 is made of substantially transparent material, such as for example glass, PC, or PMMA, and this disclosure contemplates any suitable cover panel made of any suitable material. In one embodiment, mechanical stack 42 includes an adhesive layer 22 that couples cover panel 20 to display stack 30. As an example, adhesive layer 22 is an OCA or LOCA layer disposed between cover panel 20 and display stack 30. In one embodiment, display stack 30 having its own structure and with one or more layers 32, 34, 36, and 38 implements a display of a device that includes mechanical stack 42.

Display stack 30 includes one or more layers 32, 34, 36, and 38 associated with displaying an image to a user. As an example, display stack 30 includes a layer 36 with elements that apply signals to a pixel layer 34 of a display, a ground layer (also referred to as a common voltage (VCOM) layer) 38, and a cover layer 32. This disclosure contemplates the display being any display capable of presenting an image to a user, such as for example an LCD, OLED, etc. As illustrated in FIG. 3, cover layer 32 rests above ground layer 38, pixel layer 34, and layer 36. This disclosure contemplates the layers of display stack 30 being arranged in any appropriate order.

In one embodiment, electrodes of touch sensor 10 are disposed within display stack 30. As discussed previously, this configuration of electrodes is referred to as an in-cell implementation. However, in-cell implementations experience two issues that degrade the performance of device 50 and/or touch sensor 10. First, if touch sensor 10 implements self-capacitance touch sensing, touch sensor 10 experiences a drop in signal in low ground mass conditions. A low ground mass condition occurs when device 50 is floating relative to ground (e.g., when the device is lying flat on a table with no physical connection to GND like a charger or USB connection) and a finger or other object is touching the touch sensor. In this instance, because touch sensor 10 is modulated against the device ground, the finger or object forces the potential on the touch sensor to a stable voltage (e.g., the potential of the finger) while the device ground continues to be modulated. This results in a drop in signal from touch sensor 10, which could result in touches being more difficult to detect or touches being undetected. Second, when certain electrodes are driven with a voltage signal, the signal couples down to the source lines of a display of display stack 30. As a result, the display generates visual artifacts, which are undesirable because they degrade a user's experience with device 50. For example, the display produces unintended and/or nonsensical image(s) that confuse the user.

As will be discussed using FIGS. 4 through 8, ground layer 38 can be divided to form separate nodes/electrodes of touch sensor 10. Then, mutual capacitance touch sensing can be implemented using these nodes to reduce the impact of low ground mass conditions on touch sensor 10. Furthermore, the nodes can be driven and sensed in a particular manner that reduces visual artifacts.

Figure 4A:
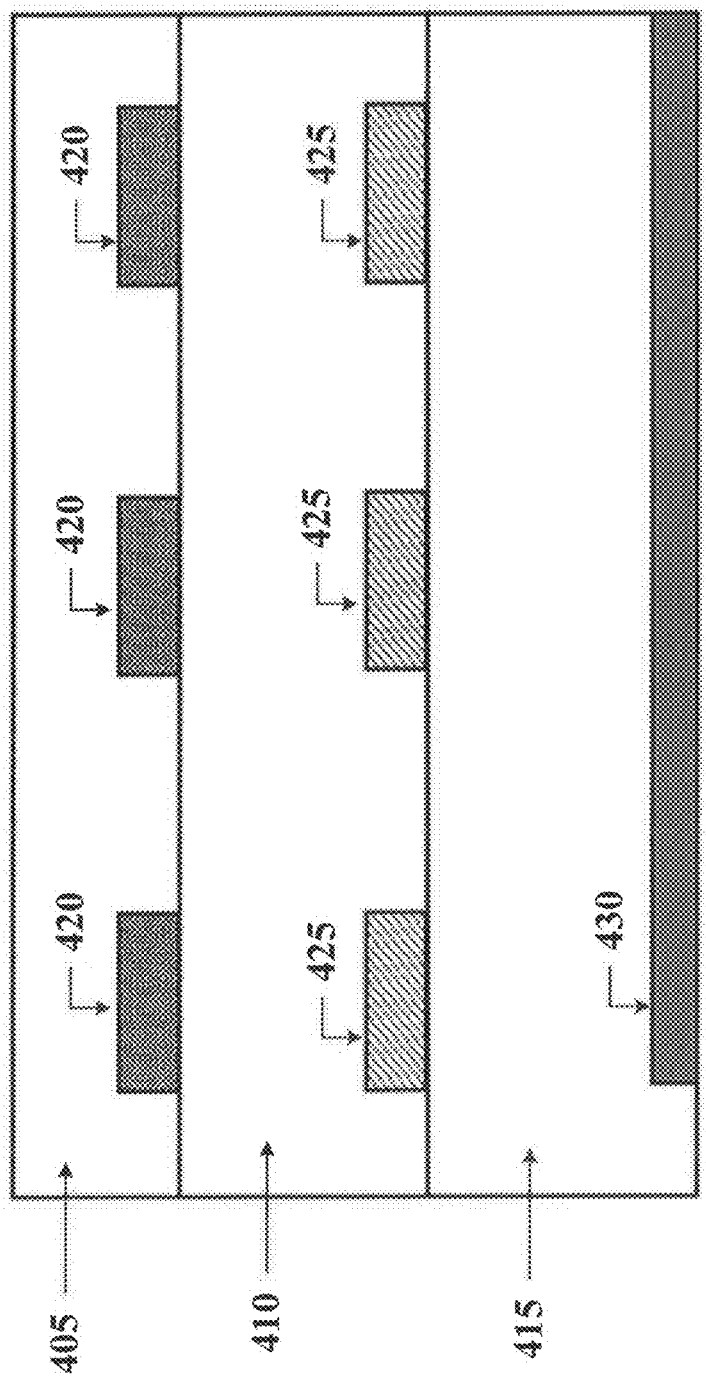

FIG. 4A illustrates an example cross-section of a layer 36 of an example display stack 30 in accordance with an embodiment. As illustrated in FIG. 4A, layer 36 includes a sense layer 405, a source layer 410, and a gate layer 415. This disclosure contemplates sense layer 405, source layer 410, and gate layer 415 arranged in any appropriate order within layer 36.

Sense layer 405 includes one or more sense lines 420. Although only three sense lines 420 are illustrated in FIG. 4A, this disclosure contemplates sense layer 405 including more than three sense lines 420. Each sense line 420 is coupled to a portion of ground layer 38 and to touch sensor controller 12. As discussed previously, each portion of ground layer 38 can be configured as a node/electrode. Each sense line 420 operates to drive and sense the node. In other words, sense lines 420 communicate signals between the nodes of ground layer 38 and touch sensor controller 12 to detect a touch event. The layout of ground layer 38 and the operation of sense lines 420 and touch sensor controller 12 will be describe in more detail using FIGS. 5 through 8.

Source layer 410 includes one or more source lines 425. Although only three source lines 425 are illustrated in FIG. 4A, this disclosure contemplates source layer 410 including more than three source lines 425. Each source line 425 communicates signals to pixels and/or one or more sub-pixels (e.g., a pixel may be formed from one or more sub-pixels) of pixel layer 34 to control the color produced by the pixel. The color is then presented to a user. In one embodiment, each source line 425 is coupled to controller 12, and controller 12 provides signals through each source line 425 to generate an image using the pixels of pixel layer 34. Furthermore, this disclosure contemplates each source line 425 being positioned directly beneath a sense line 420 in layer 36. In other words, each source line 425 is lined up with a sense line 420 when layer 36 is viewed from the top-down. In one embodiment, each source line 425 couples to a pixel and/or one or more sub-pixels of pixel layer 34. As a result, each source line 425 controls a color and/or contrast generated by one pixel and/or one or more sub-pixels.

Gate layer 415 includes one or more gate lines 430. Each gate line 430 is coupled to controller 12 in one embodiment. Each gate line 430 communicates a signal that updates a portion of pixel layer 34. For example, each gate line 430 may be driven with a signal and communicates that signal to a pixel of pixel layer 34. When the pixel receives the signal from gate line 430, the pixel may update the color it produces based on another signal received from a corresponding source line 425. Although FIG. 4A illustrates only one gate line 430 in gate layer 415, this disclosure contemplates gate layer 415 including more than one gate line 430. Furthermore, as illustrated in FIG. 4A, gate line 430 is arranged perpendicular to sense lines 420 and source lines 425. As a result, multiple gate lines 430 are positioned perpendicular to sense lines 420 and source lines 425 across the length of sense lines 420 and source lines 425. In one embodiment, each gate line 430 is coupled to a row of pixels of pixel layer 34. As a result, each gate line 430 controls when a row of pixels update.

This disclosure contemplates sense layer 405, source layer 410, and gate layer 415 being arranged in any appropriate manner. For example, as illustrated in FIG. 4B, gate layer 415 may be positioned between sense layer 405 and source layer 410 in layer 36. In the illustrated example of FIG. 4B, the capacitive coupling between sense lines 420 and source lines 425 is reduced because gate layer 415 separates sense layer 405 from source layer 410. As a result, signals communicated by sense lines 420 transfer less charge to source lines 425 thereby reducing the effect that signals communicated by sense lines 420 have on source lines 425. In one embodiment, separating sense lines 420 from source lines 425 increases the distance between sense lines 420 and source lines 425, which lowers the capacitive coupling between sense line 420 and source lines 425. As a result, signals communicated through sense lines 420 have less impact on source lines 425, which reduces the chance that visual artifacts will be created. Although separating sense layer 405 from source layer 410 reduces the likelihood of visual artifacts, this disclosure contemplates layer 36 being arranged with sense layer 405 being adjacent to source layer 410.

Figure 5A:
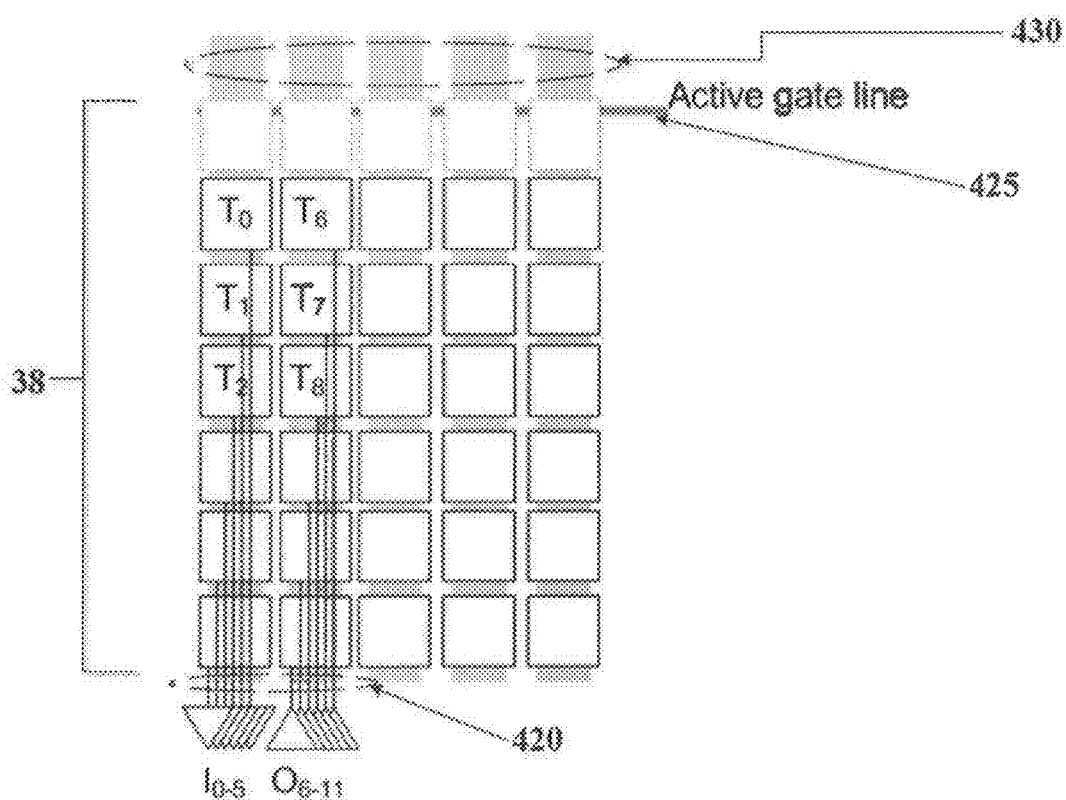
FIG. 5A illustrates an example ground layer of an example display stack in accordance with an embodiment.
Figure 5B:
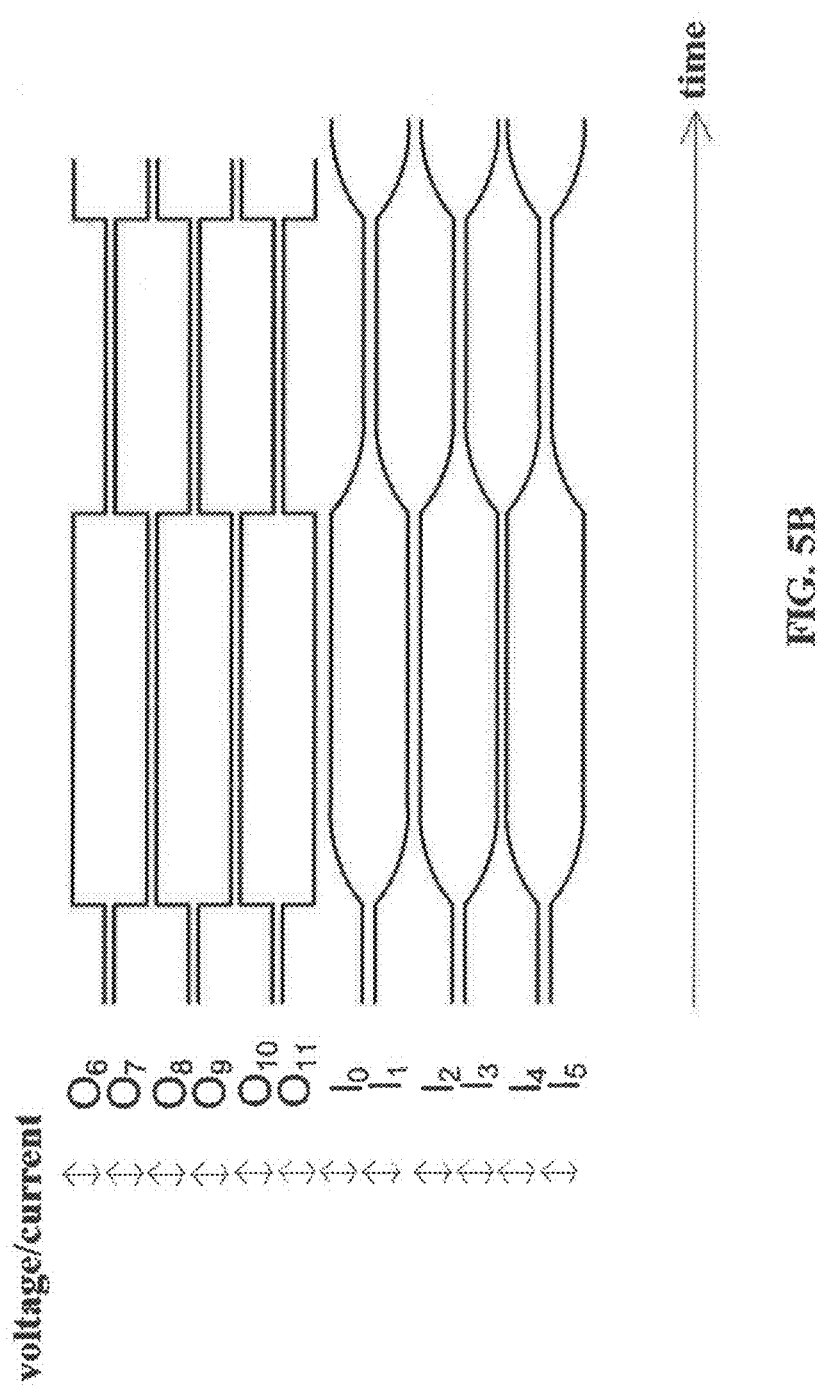
FIG. 5B illustrates an example signal response in accordance with an embodiment.

FIG. 5A illustrates an example ground layer 38 of an example display stack 30 in accordance with an embodiment. As illustrated in FIG. 5A, ground layer 38 is divided into multiple nodes. Each node is coupled to a sense line 420. Each node is separate and distinct from another node of ground layer 38. In one embodiment, a column of nodes is driven with signals from sense lines 420 and an adjacent column of nodes is sensed to determine whether a touch event occurred. Although this disclosure illustrates nodes as quadrilaterals and/or squares, this disclosure contemplates ground layer 38 using any number of nodes of any shape or design.

As illustrated in FIG. 5A, display stack 30 includes source lines 425 and one or more gate lines 430. Source lines 425 are positioned underneath sense lines 420 and run parallel to sense lines 420. Gate line 430 is positioned underneath sense lines 420 and runs perpendicular to sense lines 420 and source lines 425. The nodes of ground layer 38 are positioned above sense lines 420, source lines 425, and gate line 430. For clarity, not all sense lines 420, source lines 425, gate lines 430, and nodes of the display stack have been illustrated in FIG. 5A. However, it is contemplated that each node of ground layer 38 is coupled to a sense lines 420, and that each pixel of pixel layer 34 is coupled to a source lines 425 and gate line 430.

In one embodiment, each node of ground layer 38 corresponds to a pixel of pixel layer 34. As a result, each node of ground layer 38 is positioned directly beneath or above a pixel of pixel layer 34. In this manner each node of ground layer 38 can operate both as a ground layer for the pixel of pixel layer 34 and as a touch sensor node.

Touch sensor controller 12 drives and senses the nodes of ground layer 38 using sense lines 420 to detect touch events. For example, touch sensor controller 12 can implement a self-capacitance touch sensor using the nodes of ground layer 38. In that implementation, touch sensor controller 12 drives a node (e.g., node T6) using a sense line O6. After node T6 is charged, touch sensor controller 12 senses node T6 over sense line O6. Touch sensor controller 12 repeats this driving and sensing process across the nodes of ground layer 38. However, as discussed previously, a self-capacitance touch sensing implementation causes a net charge to be deposited on the nodes of ground layer 38. Due to a capacitive coupling between sense lines 420 and source lines 425, portions of the net charge carried by sense lines 420 can transfer to source lines 425. As a result, source lines 425 carry an unintended signal to the pixels of pixel layer 34 thereby causing visual artifacts. Furthermore, as discussed previously, low ground mass conditions degrade the performance of self-capacitance touch sensors. For example, when a device is lying flat on a table. As a result, the peak signal produced by the touch sensor is reduced, thereby making it more difficult for the touch sensor controller to detect a touch. This disclosure contemplates touch sensor controller 12 implementing a mutual capacitance touch sensor using the nodes of ground layer 38 and sense lines 420. This implementation reduces visual artifacts and the impact of low ground mass conditions in one embodiment.

To implement the mutual capacitance touch sensor, touch sensor controller 12 drives a column of nodes of ground layer 38 and senses an adjacent column of nodes of ground layer 38. In the illustrated examples of FIGS. 5A and 5B, touch sensor controller 12 drives a column of nodes that includes nodes T6, T7 and T8 using sense lines O6 through O11. Touch sensor controller 12 senses an adjacent column of nodes that includes nodes T0, T1 and T2 using sense lines I0 through I5. As touch sensor controller 12 drives the first column of nodes that includes nodes T6, T7 and T8, a charge is transferred between the nodes of the first column and the nodes of the second column due to a mutual capacitance between the nodes of the columns. Touch sensor controller 12 can sense the nodes of the second column such as nodes T0, T1 and T2 to measure a value (e.g., voltage, current, time to charge/discharge, etc.) reflecting an amount of charge transferred from the nodes of the first column to the nodes of the second column. Based on that value, touch sensor controller 12 can determine whether a touch event occurred. In one embodiment, by implementing a mutual capacitance touch sensor using the nodes of ground layer 38, touch sensor 10 is more resistant to low ground mass conditions in device 50. As a result, the performance of touch sensor 10 is improved.

Touch sensor controller 12 repeats this driving and sensing process across the columns of ground layer 38. For example, after sensing the second column of nodes that includes nodes T0, T1, and T2, touch sensor controller 12 may drive a third column of nodes (e.g., the column to the right of the first column that includes nodes T6, T7, and T8 as illustrated in the example of FIG. 5A) and sense the first column of nodes that includes T6, T7, and T8. Touch sensor controller 12 can continue this driving and sensing process moving one or more columns at a time. In one embodiment, alternating between driving and sensing for a column is done by multiplexers inside touch sensor 10 and/or device 50. Although this disclosure describes touch sensor controller 12 driving and sensing columns of nodes in a particular order, this disclosure contemplates touch sensor controller 12 driving and sensing columns of nodes in any order.

To avoid depositing a net charge through sense lines 420, touch sensor controller 12 drives a column of nodes such that a net voltage of the driven nodes is substantially zero. This disclosure contemplates a substantially zero voltage being a voltage less than or equal to two millivolts. In the example signaling diagram in FIG. 5B, touch sensor controller 12 drives a column of nodes using reverse polarity signals to establish a net voltage that is substantially zero. For example, node T6 is driven using sense line O6 with a positive voltage at the same time adjacent node T7 is driven using sense line O7 with a negative voltage. This pattern of paring a positive voltage with a negative voltage continues down the column. As a result, the column of nodes that includes nodes T6, T7 and T8 is driven but the net voltage across the column is substantially zero. As can be seen in the signaling diagram, the positive and negative voltages transfer positive and negative charges to the nodes of the adjacent column that includes nodes T0, T1 and T2. Touch sensor controller 12 measures values reflecting the charge transferred to the adjacent column to determine whether a touch event occurred. These measurements can be taken through sense lines I0 through I5. By driving the first column of nodes that includes nodes T6, T7 and T8 with signals such that the resulting net voltage is substantially zero, touch sensor controller 12 reduces the charge transferred from sense lines 420 to source lines 425. In this manner visual artifacts can be reduced and/or prevented. Although square waves are used to drive a column of nodes in the example of FIG. 5B, this disclosure contemplates using any type of signal to drive the column of nodes. This disclosure also contemplates that each column of nodes or each node can be driven by a distinct signal (e.g., a square wave implemented per pin connected to a single column or node) or by a singular signal (e.g., a square wave sent to a central modulator and multiplexed out to multiple pins). An inverter may be used to generate a reverse polarity signal. Alternatively, an inverted signal may be sent to a separate modulator to drive columns or nodes using the inverted signal. For a DC free scan, the modulated signal may be modulation symmetrical around the LCD VCOM voltage. In certain embodiments, the signal-to-noise ratio (e.g., the voltage signal generated by a touch vs the voltage generated by noise caused by device components and external components) of a touch sensor can be doubled (e.g., 60× vs. 30×) by using the contemplated mutual capacitance touch sensor.

In one embodiment, touch sensor controller 12 does not drive the nodes of a column that are directly above an active gate line 430 at the same time as the rest of the column is being driven. As can be seen in the illustrated example of FIG. 5A, while the column of nodes that includes T6, T7 and T8 is being driven using sense lines O6 through O11, the node above node T6 is not being driven because that node is positioned directly above active gate line 430. This means that the pixel corresponding to that node is being updated. To avoid disturbing the update process, the node above node T6 is not driven when the rest of the column of nodes is being driven. Although not illustrated, each row of nodes may be positioned above one or more gate lines 430. When those gate lines become active to update the pixels above that row of nodes, that row of nodes will not be driven by touch sensor controller 12 so as to not disturb the update process.

Figure 6:
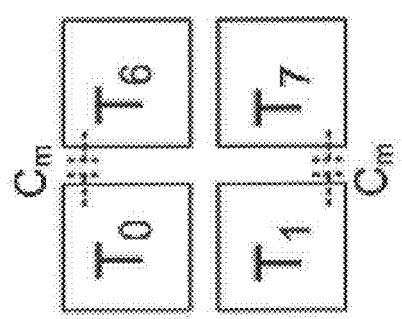
FIG. 6 illustrates an example configuration of nodes of an example ground layer in accordance with an embodiment.

FIG. 6 illustrates an example configuration of nodes of an example ground layer 38 in accordance with an embodiment. As shown in FIG. 6, nodes T0 and T1 have a mutual capacitance between nodes T6 and T7, respectively. As a result, when nodes T6 and T7 are driven with voltage signals, charge will be transferred from node T6 to T0 and from T7 to T1. The amount of charge transferred depends on the magnitude of the mutual capacitance between the nodes. When an object such as a finger touches the portion of touch sensor 10 corresponding to nodes T0, T1, T6 and T7, the mutual capacitance between these nodes changes. As a result of that change, the amount of charge that is transferred from T6 to T0 and from T7 to T1 changes. Touch sensor controller 12 can measure a value by sensing nodes T0 and T1 that reflects the amount of charge transferred from nodes T6 and T7, respectively. When touch sensor controller 12 detects this difference in charge transfer, touch sensor controller 12 can determine that a touch event occurred.

Figure 7:
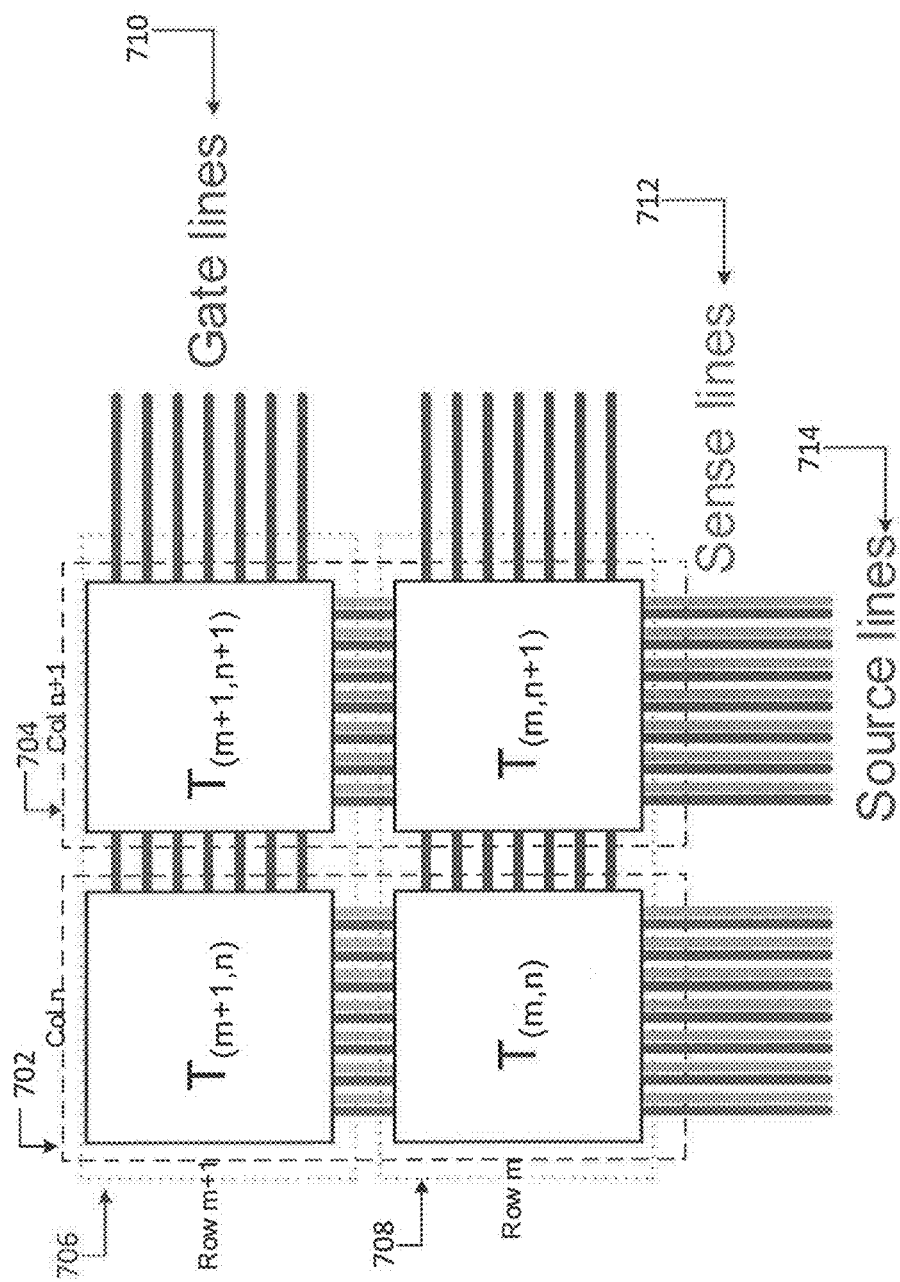
FIG. 7 illustrates an example configuration of nodes of an example ground layer in accordance with an embodiment.

FIG. 7 illustrates an example configuration of nodes of an example ground layer 38 in accordance with an embodiment. As illustrated in FIG. 7, each column 702, 704 of nodes is positioned above multiple source lines 714 and sense lines 712 that run parallel to the column 702, 704. Additionally, each row 706, 708 of nodes is positioned above one or more gate lines 710 that run parallel to the row 706, 708.

Each source line 714 provides a signal to a pixel positioned beneath a node of the column 702, 704. Each node of the column 702, 704 is positioned above a pixel of the pixel layer. The source line 714 for the pixel communicates a signal to the pixel indicating what color the pixel should output.

Each sense line 712 underneath the column couples to a node of the column 702, 704. The sense line 712 for a node can drive the node and measure a value from the node reflective of an amount of charge transferred to the node. By driving and/or sensing the nodes of the column 702, 704, a touch sensor controller 12 can detect whether a touch event occurred.

Each gate line 710 positioned beneath a row 706, 708 of electrodes provides a signal to a pixel positioned under a node of the row 706, 708 of nodes. The gate line 710 controls when that pixel updates. When the gate line 710 for that pixel is active, the pixel updates the color that it produces based on a signal communicated by a source line 712 to that pixel. In this manner the image generated by the array of pixels can be updated.

Figure 8:
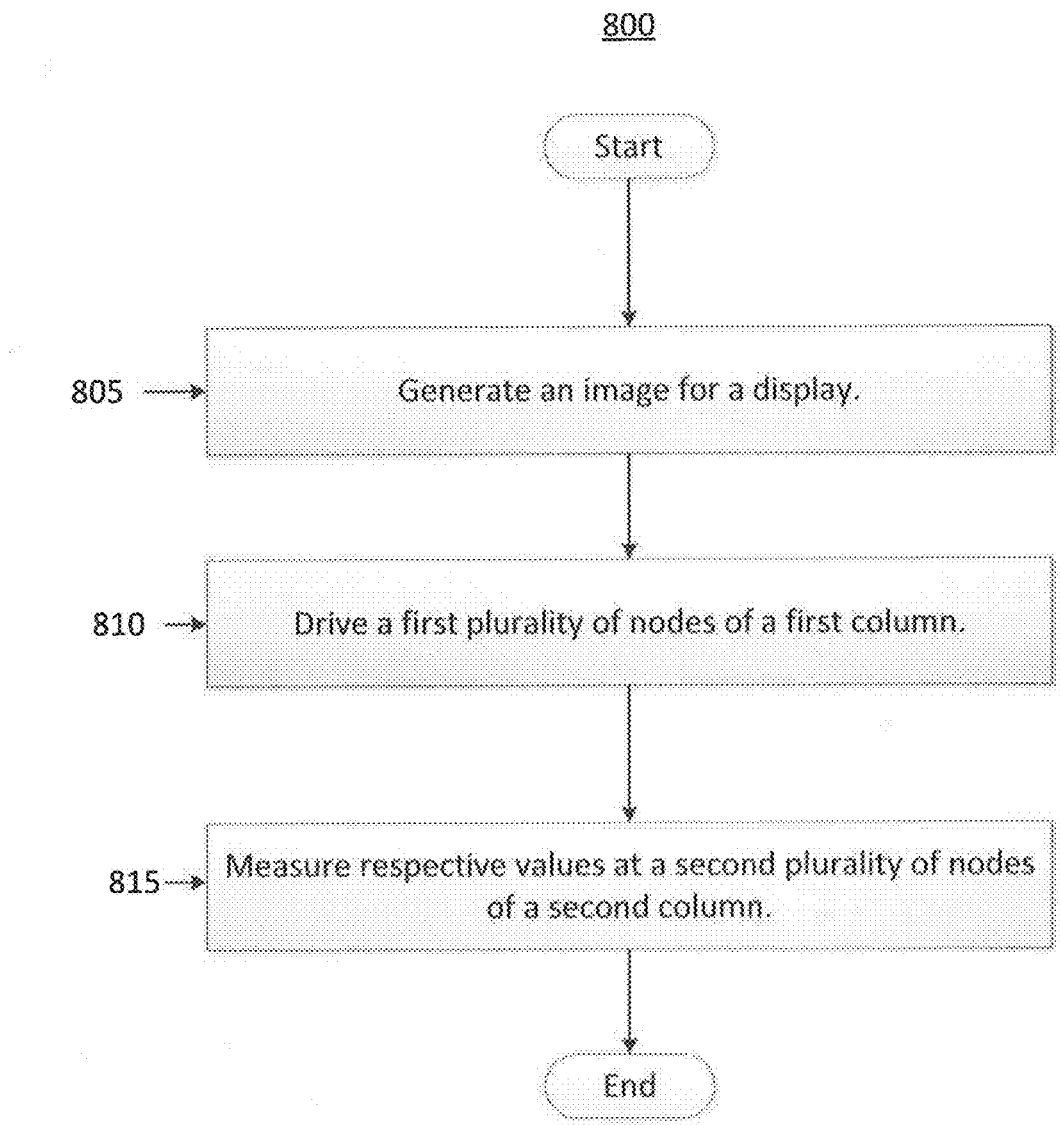
FIG. 8 is a flowchart illustrating an example method of operating a touch sensor in accordance with an embodiment.

FIG. 8 is a flowchart illustrating an example method 800 of operating a touch sensor 10 in accordance with an embodiment. In one embodiment, touch sensor controller 12 performs method 800. By performing method 800, touch sensor controller 12 reduces the impact of low ground mass conditions on touch sensor 10. Furthermore, by performing method 800 touch sensor controller 12 reduces visual artifacts.

In step 805, touch sensor controller 12 generates an image for a display. In one embodiment, touch sensor controller 12 generates the image by communicating signals to pixels of a pixel layer of the display through source lines and gate lines. The source lines communicate signals indicating the color to be generated by the pixels and the gate lines communicate signals indicating when the pixels should update.

In step 810, touch sensor controller 12 drives a first plurality of nodes of a first column of a ground layer such that a sum of the voltages of the first plurality of nodes is substantially zero. In one embodiment, touch sensor controller 12 drives the first plurality of nodes using reverse polarity signals. For example, one node of the first plurality of nodes is driven with a positive voltage signal and an adjacent node of the first plurality of nodes is driven with a negative voltage signal. As a result, a sum of the voltages of the first plurality of nodes is substantially zero. This disclosure contemplates a substantially zero voltage being a voltage that is less than or equal to two millivolts. In this manner touch sensor controller 12 reduces visual artifacts because a smaller net voltage is communicated to the first plurality of nodes. As a result, less charge is transferred to the source lines for each pixel thereby reducing the visual artifacts generated by the pixels.

In step 815, touch sensor controller 12 measures respective values at a second plurality of nodes of a second column. The second column is adjacent to the first column. The values reflect an amount of charge transferred from the first plurality of nodes to the second plurality of nodes. Based on those values, touch sensor controller 12 determines whether a touch event occurred. As a result, touch sensor controller 12 detects touches using a mutual capacitance touch sensing scheme. By using the mutual capacitance touch sensing scheme, touch sensor controller 12 reduces the impact of low ground mass conditions on touch sensor 10.

Modifications, additions, or omissions may be made to method 800 depicted in FIG. 8. Method 800 may include more, fewer, or other steps. For example, steps may be performed in parallel or in any suitable order. While discussed as controller 12 performing the steps, any suitable component, such as touch sensor 10 for example, may perform one or more steps of the method.

In some embodiments, touch sensor 10 provides less than a 1 milliVolt peak for a coupling between a non-modulated node and a source line underneath the node. Existing systems can tolerate a peak voltage greater than 3 milliVolts without causing display or touch sensing issues on the non-modulated pixels. Thus, touch sensor 10 provides even better performance than existing touch sensors in some embodiments.

Additionally, in some embodiments, touch sensor 10 provides a noise peak of 1.3 milliVolts for a modulated node coupling to an unmodulated neighbor node through a sense line, which is well below existing systems and requirements. Neighbor nodes may have a strong coupling to the modulated node. Thus, touch sensor 10 offers improved performance over existing touch sensors in this regard in some embodiments.

Furthermore, in some embodiments, touch sensor 10 provides a strong coupling into source lines routed along a modulated sense line. This coupling can be reduced by placing the gate line between the source and sense lines, as illustrated in FIG. 4B.

Herein, reference to a computer-readable storage medium may include a semiconductor-based or other IC (such, as for example, a field-programmable gate array (FPGA) or an ASIC), a hard disk drive (HDD), a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable computer-readable storage medium, or a suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus comprising:
   a display stack comprising a display and a ground layer for generating an image for the display, the ground layer comprising a plurality of columns, each column of the plurality of columns comprising a plurality of nodes;
   a controller coupled to the display stack, the controller configured to perform operations comprising:
      providing voltages to a first plurality of nodes, respectively, of a first column of the plurality of columns of the ground layer such that a sum of the respective voltages of the first plurality of nodes of the first column is substantially zero; and
      measuring, to determine whether a touch event occurred, respective values at a second plurality of nodes of a second column of the plurality of columns, the respective values at the second plurality of nodes indicating an amount of charge transferred from the first plurality of nodes to the second plurality of nodes.

2. The apparatus of claim 1, the operations further comprising:
   providing, at a point in time, a voltage to a gate line of the display stack to update the display; and
   not providing, at the point in time, a voltage to a node that overlaps the gate line.

3. The apparatus of claim 1, wherein each node of the first plurality of nodes is provided with a signal that is opposite in polarity from a signal driving an adjacent node of the first column.

4. The apparatus of claim 1, the operations further comprising:
   providing voltages to a third plurality of nodes, respectively, such that a sum of the respective voltages of the third plurality of nodes is substantially zero; and
   measuring, to determine whether a touch event occurred, respective values at the first plurality of nodes, the respective values at the first plurality of nodes reflecting an amount of charge transferred from the third plurality of nodes to the first plurality of nodes.

5. The apparatus of claim 1, further comprising a plurality of source lines, wherein:
   the display comprises a plurality of pixels;
   each source line of the plurality of source lines communicates a signal that controls a pixel of the plurality of pixels; and
   the first plurality of nodes overlaps the plurality of source lines.

6. The apparatus of claim 1, further comprising a plurality of sense lines, each sense line of the plurality of sense lines couples the controller to a node of the first plurality of nodes, each sense line couples to a different node of the first plurality of nodes than every other sense line of the plurality of sense lines.

7. The apparatus of claim 1, wherein:
   the display stack comprises a sense line layer, a gate line layer, and a source line layer; and
   the gate line layer is positioned between the sense line layer and the source line layer.

8. A non-transitory computer-readable medium storing logic, the logic configured to, when executed by a processor, cause the processor to perform operations comprising:
   causing a display of a display stack to generate an image;
   providing voltages to a first plurality of nodes, respectively, of a first column of a plurality of columns of a ground layer of the display stack such that a sum of the respective voltages of the first plurality of nodes of the first column is substantially zero; and measuring, to determine whether a touch event occurred, respective values at a second plurality of nodes of a second column of the plurality of columns, the respective values at the second plurality of nodes indicating an amount of charge transferred from the first plurality of nodes to the second plurality of nodes.

9. The non-transitory computer-readable medium of claim 8, the operations further comprising:

providing, at a point in time, a voltage to a gate line of the display to update the image; and not providing, at the point in time, a voltage to a node that overlaps the gate line.

10. The non-transitory computer-readable medium of claim 8, wherein driving the first plurality of nodes comprises:

providing a first signal having a first polarity to a first node of the first plurality of nodes;

providing a second signal having a second polarity that is opposite in polarity to the first polarity to a second node adjacent to the first node.

11. The non-transitory computer-readable medium of claim 8, the operations further comprising:

providing voltages to a third plurality of nodes, respectively, such that a sum of the respective voltages of the third plurality of nodes is substantially zero; and measuring, to determine whether a touch event occurred, respective values at the first plurality of nodes, the respective values at the first plurality of nodes reflecting an amount of charge transferred from the third plurality of nodes to the first plurality of nodes.

12. The non-transitory computer-readable medium of claim 8, wherein causing the display to generate the image comprises communicating, through a plurality of source lines, respective signals that control respective pixels of the display.

13. The non-transitory computer-readable medium of claim 8, the operations further comprising determining that a touch event occurred in response to a determination that the measured respective values changed.

14. A device comprising:

one or more processors; and one or more memory units coupled to the one or more processors, the one or more memory units collectively storing logic configured to, when executed by the one or more processors, cause the one or more processors to perform operations comprising:

generating an image for a display of a display stack;

providing voltages to a first plurality of nodes, respectively, of a first column of a plurality of columns of a ground layer of the display stack such that a sum of the respective voltages of the first plurality of nodes of the first column is substantially zero; and measuring, to determine whether a touch event occurred, respective values at a second plurality of nodes of a second column of the plurality of columns of the ground layer, the respective values at the second plurality of nodes indicating an amount of charge transferred from the first plurality of nodes to the second plurality of nodes.

15. The device of claim 14, wherein the operations further comprise:

providing, at a point in time, a voltage to a gate line of the display stack to update the display; and not providing, at the point in time, a voltage to a node that overlaps the gate line.

16. The device of claim 14, wherein each node of the first plurality of nodes is provided with a signal that is opposite in polarity from a signal driving an adjacent node of the first column.

17. The device of claim 14, wherein the operations further comprise:

providing voltages to a third plurality of nodes, respectively, such that a sum of the respective voltages of the third plurality of nodes is substantially zero; and measuring, to determine whether a touch event occurred, respective values at the first plurality of nodes, the respective values at the first plurality of nodes reflecting an amount of charge transferred from the third plurality of nodes to the first plurality of nodes.

18. The device of claim 14, further comprising a plurality of source lines, wherein:

the display comprises a plurality of pixels;

each source line of the plurality of source lines communicates a signal that controls a pixel of the plurality of pixels; and the first plurality of nodes overlaps the plurality of source line.

19. The device of claim 14, further comprising a plurality of sense lines, each sense line of the plurality of sense lines couples the controller to a node of the first plurality of nodes, each sense line couples to a different node of the first plurality of nodes than every other sense line of the plurality of sense lines.

20. The device of claim 14, wherein:

the display stack comprises a sense line layer, a gate line layer, and a source line layer; and the gate line layer is positioned between the sense line layer and the source line layer.

* * * * *